US008649251B2

(12) United States Patent
Guo et al.

(10) Patent No.: US 8,649,251 B2
(45) Date of Patent: Feb. 11, 2014

(54) MULTI-USER MULTIPLEXING METHOD AND TRANSMISSION DEVICE

(75) Inventors: Senbao Guo, Guangdong Province (CN); Aihua Peng, Guangdong Province (CN); Min Wei, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 247 days.

(21) Appl. No.: 13/258,600

(22) PCT Filed: Oct. 20, 2010

(86) PCT No.: PCT/CN2010/077925
§ 371 (c)(1),
(2), (4) Date: Nov. 29, 2011

(87) PCT Pub. No.: WO2011/072553
PCT Pub. Date: Jun. 23, 2011

(65) Prior Publication Data
US 2012/0106317 A1 May 3, 2012

(30) Foreign Application Priority Data
Dec. 18, 2009 (CN) .......................... 2009 1 0261639

(51) Int. Cl.
*H04J 11/00* (2006.01)
(52) U.S. Cl.
USPC .......................................... 370/203; 370/329
(58) Field of Classification Search
USPC .......................... 370/203, 328, 329, 338, 465
See application file for complete search history.

(56) References Cited

U.S. PATENT DOCUMENTS

| | | | | |
|---|---|---|---|---|
| 7,949,064 B2 * | 5/2011 | Lin et al. | | 375/267 |
| 8,064,394 B2 * | 11/2011 | Jongren et al. | | 370/329 |
| 8,068,555 B2 * | 11/2011 | Jongren et al. | | 375/295 |
| 8,116,277 B2 * | 2/2012 | Lee et al. | | 370/329 |

(Continued)

FOREIGN PATENT DOCUMENTS

| | | |
|---|---|---|
| CN | 101515845 A | 8/2009 |
| CN | 101577573 A | 11/2009 |
| WO | 2007094786 A1 | 8/2007 |

OTHER PUBLICATIONS

International Search Report for PCT/CN2010/077925 dated Jan. 10, 2011.

*Primary Examiner* — Ricky Ngo
*Assistant Examiner* — Christine Ng
(74) *Attorney, Agent, or Firm* — Ling Wu; Stephen Yang; Ling and Yang Intellectual Property

(57) ABSTRACT

The present invention provides a method and apparatus for multi-user multiplexing. The method includes: a transmission apparatus performing layer mapping on data steams to be transmitted of an open-loop user and a close-loop user respectively; the transmission apparatus performing pre-coding processing on a layer data matrix of the open-loop user and the close-loop user obtained by the layer mapping; and the transmission apparatus mapping the layer data matrix after the pre-coding processing to a plurality of transmission antennas to be sent. The method of the present invention can improve frequency spectrum utilization ratio in the case of the a cell being full load or other possible scenarios, and its performance is better than the multiplexing of two close-loop users who are completely not suitable for pairing. Therefore, the method of the present invention is an optimal scheme adopted in some specified scenarios.

15 Claims, 1 Drawing Sheet

(56) References Cited

U.S. PATENT DOCUMENTS

| | | | |
|---|---|---|---|
| 8,160,177 B2* | 4/2012 | Zhang et al. | 375/299 |
| 8,335,274 B2* | 12/2012 | Jongren | 375/267 |
| 8,385,441 B2* | 2/2013 | Perets et al. | 375/260 |
| 8,406,787 B2* | 3/2013 | Kangas et al. | 455/456.1 |
| 2013/0003812 A1* | 1/2013 | Collotta et al. | 375/227 |

* cited by examiner

MULTI-USER MULTIPLEXING METHOD AND TRANSMISSION DEVICE

TECHNICAL FIELD

The present invention relates to a long term evolution advanced (LTE-Advanced) system, and particularly, to a method for a multi-user multiplexing and a transmission apparatus in the LTE-Advanced system.
LTE-Advanced System.

BACKGROUND OF THE RELATED ART

In a long term evolution (LTE) system, a downlink defines that a diversity way is a space-frequency block coding (SFBC) when transmission antennas are 2 antennas, and a coding matrix is as shown in formula 1; and the diversity way is a SFBC+FSTD (frequency switched transmit diversity) when the transmission antennas are 4 antennas, and a coding matrix is as shown in formula 2.

$$\begin{bmatrix} S_1 & -S_2^* \\ S_2 & S_1^* \end{bmatrix}$$

$$\begin{bmatrix} S_1 & 0 & -S_2^* & 0 \\ S_2 & 0 & S_1^* & 0 \\ 0 & S_3 & 0 & -S_4^* \\ 0 & S_4 & 0 & S_3^* \end{bmatrix}$$

In the existing standard version of the LTE, there are only a transmission diversity in a case of open-loop and a multi-user multiplexing in a case of close-loop, that is to say that the case of user multiplexing does not exist in the case of the open-loop, diversity users respectively occupy a certain resources, and the multiplexing only considers multiplexing among the users with the better channel condition and moving in a lower speed.

SUMMARY OF THE INVENTION

The present invention provides a method for multi-user multiplexing and a transmission apparatus, which can effectively improve the spectrum utilization ratio.

In order to solve the above technical problem, the present invention provides a method for multi-user multiplexing, and the method comprises:

a transmission apparatus performing a layer mapping on data steams to be transmitted of an open-loop user and a close-loop user respectively;

the transmission apparatus performing a pre-coding processing on a layer data matrix of the open-loop user and the close-loop user obtained by the layer mapping; and the transmission apparatus mapping the layer data matrix after the pre-coding processing to a plurality of transmission antennas to be sent.

The step of performing the pre-coding processing can comprises: calculating pre-coding matrixes $W_1$ and $W_2$, wherein, the $W_2$ is a space vector of zero space of a channel matrix $H_1$ of the close-loop user, and said $W_1$ ensures that the signal to interference noise ratio (SINR) of the close-loop user is a maximum value; and completing the pre-coding processing on the pre-coding matrixes $W_1$ and $W_2$ and the layer data matrix of the open-loop user and the close-loop user according to a transmission matrix.

In a case of 4 transmission antennas and the data steams to be transmitted of the close-loop user being mapped to 1 layer, the transmission matrix can be:

$$[W_1 \quad W_2] \begin{bmatrix} u_1 & u_2 \\ S_1 & S_2 \\ -S_2^* & S_1^* \end{bmatrix},$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

In a case of 4 transmission antennas and the data steams to be transmitted of the close-loop user being mapped to 2 layers, the transmission matrix can be:

$$[W_1 \quad W_2] \begin{bmatrix} u_1 & u_3 \\ u_2 & u_4 \\ S_1 & S_2 \\ -S_2^* & S_1^* \end{bmatrix},$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

In a case of 8 transmission antennas and the data steams to be transmitted of the close-loop user being mapped to 1 layer, when the data steams to be transmitted of the open-loop user are mapped to 2 layers, the transmission matrix can be:

$$[W_1 \quad W_2] \begin{bmatrix} u_1 & u_2 \\ S_1 & S_2 \\ -S_2^* & S_1^* \end{bmatrix};$$

when the data steams to be transmitted of the open-loop user are mapped to 4 layers, the transmission matrix can be:

$$[W_1 \quad W_2] \begin{bmatrix} u_1 & u_2 & u_3 & u_4 \\ S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix};$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

In a case of 8 transmission antennas and the data steams to be transmitted of the close-loop user being mapped to 2 layers, when the data steams to be transmitted of the open-loop user are mapped to 2 layers, the transmission matrix can be:

$$[W_1 \quad W_2] \begin{bmatrix} u_1 & u_3 \\ u_2 & u_4 \\ S_1 & S_2 \\ -S_2^* & S_1^* \end{bmatrix};$$

when the data steams to be transmitted of the open-loop user are mapped to 4 layers, the transmission matrix can be:

$$[W_1 \quad W_2] \begin{bmatrix} u_1 & u_3 & u_5 & u_7 \\ u_2 & u_4 & u_6 & u_8 \\ S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix},$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

In a case of 8 transmission antennas and the data steams to be transmitted of the close-loop user being mapped to 3 layers, when the data steams to be transmitted of the open-loop user are mapped to 2 layers, the transmission matrix can be:

$$[W_1 \quad W_2] \begin{bmatrix} u_1 & u_4 \\ u_2 & u_5 \\ u_3 & u_6 \\ S_1 & S_2 \\ -S_2^* & S_1^* \end{bmatrix};$$

when the data steams to be transmitted of the open-loop user are mapped to 4 layers, the transmission matrix can be:

$$[W_1 \quad W_2] \begin{bmatrix} u_1 & u_4 & u_7 & u_{10} \\ u_2 & u_5 & u_8 & u_{11} \\ u_3 & u_6 & u_9 & u_{12} \\ S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix},$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

In a case of 8 transmission antennas and the data steams to be transmitted of the close-loop user being mapped to 4 layers, when the data steams to be transmitted of the open-loop user are mapped to 2 layers, the transmission matrix can be:

$$[W_1 \quad W_2] \begin{bmatrix} u_1 & u_5 \\ u_2 & u_6 \\ u_3 & u_7 \\ u_4 & u_8 \\ S_1 & S_2 \\ -S_2^* & S_1^* \end{bmatrix};$$

when the data steams to be transmitted of the open-loop user are mapped to 4 layers, the transmission matrix can be:

$$[W_1 \quad W_2] \begin{bmatrix} u_1 & u_5 & u_9 & u_{13} \\ u_2 & u_6 & u_{10} & u_{14} \\ u_3 & u_7 & u_{11} & u_{15} \\ u_4 & u_8 & u_{12} & u_{16} \\ S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix},$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

In a case that the number of transmission antennas is $N_T$, the method as any one of the above of 4 transmission antennas or 8 transmission antennas is adopted, or a following transmission matrix is adopted to perform the pre-coding processing:

$$[W_1, W_2] \begin{bmatrix} u_1 & u_2 & u_3 & u_4 & \ldots & u_{n-3} & u_{n-2} & u_{n-1} & u_n \\ u_{n+1} & u_{n+2} & u_{n+3} & u_{n+4} & \ldots & u_{2n-3} & u_{2n-2} & u_{2n-1} & u_{2n} \\ \vdots & \vdots & \vdots & \vdots & \ldots & \vdots & \vdots & \vdots & \vdots \\ u_{Nn-n+1} & u_{Nn-n+2} & u_{Nn-n+3} & u_{Nn-n+4} & \ldots & u_{Nn-3} & u_{Nn-2} & u_{Nn-1} & u_{Nn} \\ S_1 & S_2 & 0 & 0 & \ldots & S_{m-3} & S_{m-2} & 0 & 0 \\ 0 & 0 & S_3 & S_4 & \ldots & 0 & 0 & S_{m-1} & S_m \\ -S_2^* & S_1^* & 0 & 0 & \ldots & -S_{m-2}^* & S_{m-3}^* & 0 & 0 \\ 0 & 0 & -S_4^* & S_3^* & \ldots & 0 & 0 & -S_m^* & S_{m-1}^* \\ \vdots & \vdots & \vdots & \vdots & \vdots & \vdots & \vdots & \vdots & \vdots \\ 0 & 0 & -S_{Mm-m+4}^* & S_{Mm-m+3}^* & \ldots & 0 & 0 & -S_{Mm}^* & S_{Mm-1}^* \end{bmatrix}$$

wherein, u is data to be transmitted of the close-loop user, S is data to be transmitted of the open-loop user, S* is a conjugate of the S, −S* is an opposite number of the conjugate of the S, the data streams to be transmitted of the close-loop user are mapped to N layers, the data streams to be transmitted of the open-loop user are mapped to M layers, N+M≤$N_T$, and $N_T$>8.

The present invention further provides a transmission apparatus, and the apparatus comprises:

a data stream processing module, which is configured to perform a layer mapping on data steams to be transmitted of an open-loop user and a close-loop user respectively;

a transmission pre-coding module, which is connected with said data stream processing module, and is configured to perform a pre-coding processing on a layer data matrix of the open-loop user and the close-loop user after the layer mapping;

a transmission antenna mapping module, which is connected with said pre-coding module, and is configured to map the layer data matrix after the pre-coding processing to a plurality of transmission antennas;

transmission antennas, which are connected with said transmission antenna mapping module, and are configured to send data.

Said transmission pre-coding module can comprise:

a transmission matrix obtaining sub-module, which is configured to obtain pre-coding matrixes $W_1$ and $W_2$, wherein the $W_2$ is a space vector of zero space of a channel matrix $H_1$ of the close-loop user, and the $W_1$ ensures that the signal to interference noise ratio (SINR) of the close-loop user is a maximum value; a pre-coding matrix processing sub-module, which can be connected with said pre-coding matrix obtaining sub-module, and is configured to complete the pre-coding processing on the pre-coding matrixes $W_1$ and $W_2$ and the layer data matrix of the open-loop user and the close-loop user according to a transmission matrix.

In the case of the cell being full load or other specified cases, the method of the present invention is adopted to multiplex the open-loop high-speed user and close-loop low-speed user together, which can improve the frequency spectrum utilization ratio. Furthermore, due to adopting the transmission matrix of the present invention to perform the pre-coding processing, the interference among multi-user can be better reduced in the transmission end, and the performance is better than that of the multiplexing of two close-loop users who are completely unsuitable for pairing. Therefore, the method of the present invention is the suboptimal scheme adopted in the specified scenarios.

PREFERRED EMBODIMENTS OF THE PRESENT INVENTION

Figure 1:
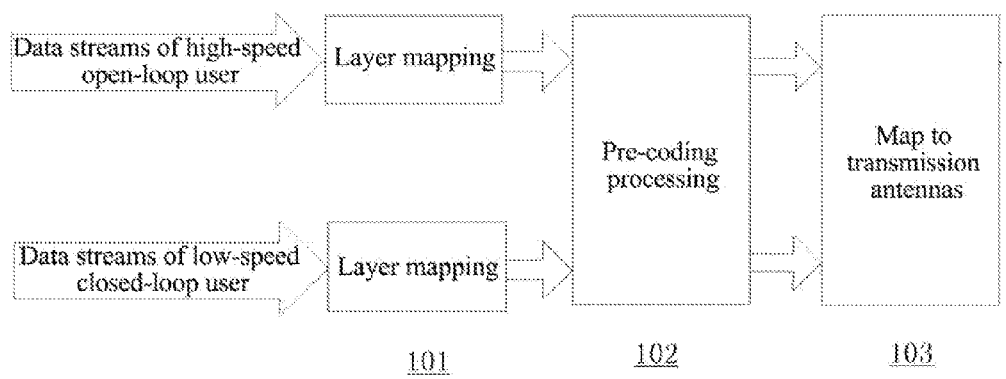
FIG. 1 is a schematic diagram of a method for multi-user multiplexing according to the present invention.

A main concept of the method for multi-user multiplexing and the transmission apparatus of the present invention is to multiplex data of the open-loop users and the close-loop users, thereby obtaining a better frequency spectrum utilization ratio in a case of larger cell load (frequency spectrum resources are shortage or saturated) or in other scenarios.

In the case that the cell load is full or the cell resource utilization has arrived at saturation, the case of multi-user multiplexing should be considered at the time. However, in this case, the existing LTE is generally limited to carry out multiplexing among the close-loop multi-user instead of considering the multiplexing of the open-loop users and the close-loop users. The present invention adds a new sending scheme based on the sending and multiplexing scheme in the existing LTE, that is, the pre-coding method of the present invention is used to multiplex the open-loop users and the close-loop users so as to sufficiently utilize the cell resources. Generally, since the user moving speed is high, the channel varies fast, thereby causing that feedback contents are unable to correctly respond the current channel of the high-speed user, and problems of the invalid feedback or large feedback error and so on are caused. For this kind of users, in order to obtain a better receiving performance, the sending way of the open-loop diversity is adopted, and all the users occupy resources separately. When the cell is full load, and in the case that the close-loop (low-speed) users have not suitable pairing already, the method of the present invention is adopted for pairing and multiplexing among the close-loop users and the open-loop users, which also can efficiently improve frequency spectrum utilization ratio in the case of the cell load being very large.

Since sending of the close-loop users is in full speed, the interference causes larger influence on the close-loop users; and in order to make the close-loop users obtain a better performance with high rank transmission, the pre-coding technique of the present invention is used to avoid the interference on the close-loop users caused by the open-loop users. The open-loop users can use sending diversity gain to reduce the interference on the open-loop users caused by the close-loop users; moreover, due to the fast variation of the high-speed user channel, the influence on the performance of the high-speed open-loop users by statistic in a long duration is not large, and it is ensured that the influence on the performance of the close-loop users is not large.

Adopting an antenna and frequency switching technique can further avoid the reduction of this kind of performances, and the open-loop user can search the optimal low-speed user to pair by calculating an angle of arrival (AOA) through the long term statistic, thereby obtaining a better performance.

The present invention makes the diversity performance to be further enhanced by selecting an optimal pre-coding vector. That is, in the case of the diversity, the pre-coding method of the present invention is used to eliminate the interference among users. Therefore, the present invention combines the pre-coding open-loop transmission diversity with the close-loop multiplexing to design a method for multi-user multiplexing with the diversity and beam form technique in LTE-Advanced system.

As shown in FIG. 1, the method for multi-user multiplexing comprises the following steps.

Step 101, the transmission apparatus performs a layer mapping on data streams to be transmitted of the open-loop user and the close-loop user.

Each kind of users has M1 and M2 streams respectively at a base station end (for the LTE-A, there can be a plurality of streams, and one user can have a plurality of streams), and there are M1+M2 streams in all for transmitting, where M1 streams are high-speed open-loop user streams and M2 streams are low-speed close-loop user streams. The open-loop high-speed user streams are changed into the user streams of the symbol level through the processes of channel coding, speed matching and modulation and so on, and then the data streams are mapped into different layers by the layer mapping, and herein for the high-speed open-loop user streams, the mapping of 2 layers and 4 layers can be carried out respectively. At the same time, the close-loop low-speed user streams are changed into the user streams of the symbol level through the processes of channel coding, speed matching and modulation and so on, and then the data streams are mapped into different layers by the layer mapping, and herein for the low-speed close-loop user streams, the mapping of the 1, 2, 3 and 4 layers can be carried out respectively.

Step 102, the transmission apparatus performs a pre-coding processing on a layer data matrix of the open-loop user and the close-loop user obtained by the layer mapping.

The process of performing the pre-coding processing comprises:

A, the pre-coding matrixes $W_1$ and $W_2$ are calculated, wherein the $W_2$ is a space vector of zero space of a channel matrix $H_1$ of the close-loop user and $W_1$ ensures that signal to interference noise ratio (SINR) of the close-loop user is the maximum value;

the pre-coding matrix $W_1$ can be calculated according to an eigenvalue decomposition method, but the maximum value of the SINR of the $W_1$ should be ensured;

there is a plurality of ways of calculating the pre-coding matrix $W_2$, such as an algorithm based on block diagonalization (BD) and so on, and the pre-coding matrix $W_2$ also can be calculated according to the following formula:

$$W_2 = (I - H_1^+ H_1) D \qquad (1)$$

$H_1$ is the channel matrix from the base station to the close-loop user, that is, a fading matrix of the channel from the base station to the close-loop user. $H_1$ can be fed back to the base station by the close-loop user, and also can be obtained by the base station by using the reciprocity of uplink and downlink;

B, the pre-coding matrixes $W_1$ and $W_2$ and layer data matrix of the close-loop user and open-loop user are completed the pre-coding processing according to a transmission matrix.

The pre-coding matrixes $W_1$ and $W_2$ obtained by calculating above and being used for the transmission matrix can eliminate the interference on the close-loop user caused by the open-loop user, which is for reason that the $W_2$ is the zero space vector of the $H_1$, and $H_1 W_2 = 0$ is ensured, thereby eliminating the interference among multi-user.

Step 103, the transmission apparatus maps the layer data matrix after the pre-coding processing to a plurality of antennas to be sent.

Data of different layers after the pre-coding performs resource mapping and antenna mapping to map the data of multi-user to the antennas to be sent.

Generally speaking, finding two close-loop users who can be well paired to multiplex is optimal, but in certain cases, the pairing cannot be found. Under the case of the cell being full load, it is required to improve the frequency spectrum utilization ratio, and at this time, the method of the present invention is adopted to multiplex the open-loop high-speed user and close-loop low-speed user together, which can improve the frequency spectrum utilization ratio. Furthermore, due to adopting the transmission matrix of the present invention to perform the pre-coding processing, the interference among multi-user can be better reduced in the transmission end, and the performance is better than that of the multiplexing of two close-loop users who are completely unsuitable for pairing. Therefore, the method of the present invention is the suboptimal scheme adopted in the specified scenarios.

The transmission matrixes of the present invention will be described in detail with reference to particular examples in the following.

Application Example 1

In the case of 4 transmission antennas, the data streams of the close-loop user being mapped to 1 layer and the data streams of the open-loop user being mapped to 2 layers, the transmission matrix of performing the pre-coding processing is:

$$[W_1 \quad W_2] \begin{bmatrix} u_1 & u_2 \\ S_1 & S_2 \\ -S_2^* & S_1^* \end{bmatrix}$$

wherein, $u_i, S_i$ are data sent by the close-loop user and the open-loop user respectively, $S_i^*$ is conjugate of $S_i$, $-S_i^*$ is the opposite number of the conjugate of $S_i$, and $i=1,2$. $W_j$ is the pre-coding matrix, and $j=1,2$.

Here, the way of the BD and so on is adopted to find the zero space of the $H_1$ to calculate the $W_2$. The calculation of the $W_1$ should ensure that the SINR of the close-loop user is the maximum value by the way of decomposing the eigenvalue of the $H_1$.

Application Example 2

In the case of 4 transmission antennas, the data streams of the close-loop user being mapped to 2 layers and the data streams of the open-loop user being mapped to 2 layers, the transmission matrix of performing the pre-coding processing is:

$$[W_1 \quad W_2] \begin{bmatrix} u_1 & u_3 \\ u_2 & u_4 \\ S_1 & S_2 \\ -S_2^* & S_1^* \end{bmatrix}$$

wherein, $u_i, S_i$ are data sent by the close-loop user and the open-loop user respectively, and $i=1,2$; $W_j$ is the corresponding pre-coding matrix, and $j=1,2$. Here, the way of the BD and so on is adopted to find the zero space of the $H_1$ to calculate the $W_2$. The calculation of the $W_1$ should ensure that the SINR of the close-loop user is the maximum value by the way of decomposing the eigenvalue of the $H_1$.

Application Example 3

In the case of 8 transmission antennas and the data streams of the close-loop user being mapped to 1 layer:

when the data streams of the open-loop user are mapped to 2 layers, the transmission matrix of performing the pre-coding processing is:

$$[W_1 \quad W_2] \begin{bmatrix} u_1 & u_2 \\ S_1 & S_2 \\ -S_2^* & S_1^* \end{bmatrix}$$

when the data streams of the open-loop user are mapped to 4 layers, the transmission matrix of performing the pre-coding processing is:

$$[W_1 \ W_2] \begin{bmatrix} u_1 & u_2 & u_3 & u_4 \\ S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix}$$

wherein, $u_i, S_i$ are data sent by the close-loop user and the open-loop user respectively, $S_i^*$ is the conjugate of the $S_i$, $-S_i^*$ is the opposite number of the conjugate of the $S_i$, and i=1,2,3,4; and $W_j$ is the pre-coding matrix, and j=1,2. The way based on the BD and so on is adopted to find the zero space of the $H_1$ to calculate the $W_2$. The calculation of the $W_1$ should ensure that the SINR of the close-loop user is the maximum value by adopting the way of decomposing the eigenvalue of the $H_1$.

Application Example 4

In the case of 8 transmission antennas and the data streams of the close-loop user being mapped to 2 layers:

when the data streams of the open-loop user are mapped to 2 layers, the transmission matrix of performing the pre-coding processing is:

$$[W_1 \ W_2] \begin{bmatrix} u_1 & u_3 \\ u_2 & u_4 \\ S_1 & S_2 \\ -S_2^* & S_1^* \end{bmatrix}$$

when the data streams of the open-loop user are mapped to 4 layers, the transmission matrix of performing the pre-coding processing is:

$$[W_1 \ W_2] \begin{bmatrix} u_1 & u_3 & u_5 & u_7 \\ u_2 & u_4 & u_6 & u_8 \\ S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix}$$

wherein, $u_i, S_i$ are data sent by the close-loop user and the open-loop user respectively, $S_i^*$ is the conjugate of the $S_i$, $-S_i^*$ is the opposite number of the conjugate of the $S_i$, and i=1,2,3,4,5,6,7,8; and $W_j$ is the pre-coding matrix, and j=1,2. The way based on the BD and so on is adopted to find the zero space of the $H_1$ to calculate the $W_2$. The calculation of the $W_1$ should ensure that the SINR of the close-loop user is the maximum value by adopting the way of decomposing the eigenvalue of the $H_1$.

Application Example 5

In the case of 8 transmission antennas and the data streams of the close-loop user being mapped to 3 layers:

when the open-loop user is mapped to 2 layers, the transmission matrix of performing the pre-coding processing is:

$$[W_1 \ W_2] \begin{bmatrix} u_1 & u_4 \\ u_2 & u_5 \\ u_3 & u_6 \\ S_1 & S_2 \\ -S_2^* & S_1^* \end{bmatrix}$$

when the open-loop user is mapped to 4 layers, the transmission matrix of performing the pre-coding processing is:

$$[W_1 \ W_2] \begin{bmatrix} u_1 & u_4 & u_7 & u_{10} \\ u_2 & u_5 & u_8 & u_{11} \\ u_3 & u_6 & u_9 & u_{12} \\ S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix}$$

wherein, $u_i, S_i$ are data sent by the close-loop user and the open-loop user respectively, $S_i^*$ is the conjugate of the $S_i$, $-S_i^*$ is the opposite number of the conjugate of the $S_i$, and i=1,2, ..., 12; and $W_j$ is the pre-coding matrix, and j=1,2. The way based on the BD and so on are adopted to find the zero space of the $H_1$ to calculate the $W_2$. The calculation of the $W_1$ should ensure that the SINR of the close-loop user is the maximum value by adopting the way of decomposing the eigenvalue of the $H_1$.

Application Example 6

In the case of 8 transmission antennas and the data streams of the close-loop user being mapped to 4 layers:

when the data streams of the open-loop user are mapped to 2 layers, the transmission matrix of performing the pre-coding processing is:

$$[W_1 \ W_2] \begin{bmatrix} u_1 & u_5 \\ u_2 & u_6 \\ u_3 & u_7 \\ u_4 & u_8 \\ S_1 & S_2 \\ -S_2^* & S_1^* \end{bmatrix}$$

when the data streams of the open-loop user are mapped to 4 layers, the transmission matrix of performing the pre-coding processing is:

$$[W_1 \ W_2] \begin{bmatrix} u_1 & u_5 & u_9 & u_{13} \\ u_2 & u_6 & u_{10} & u_{14} \\ u_3 & u_7 & u_{11} & u_{15} \\ u_4 & u_8 & u_{12} & u_{16} \\ S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix}$$

wherein, $u_i, S_i$ are data sent by the close-loop user and the open-loop user respectively, $S_i^*$ is the conjugate of the $S_i$, $-S_i^*$ is the opposite number of the conjugate of the $S_i$, and i=1,2, ..., 16; and $W_j$ is the pre-coding matrix, and j=1,2. The way based on the BD and so on is adopted to find the zero space of the $H_1$ to calculate the $W_2$. The calculation of the $W_1$ should ensure that the SINR of the close-loop user is the maximum value by adopting the way of decomposing the eigenvalue of the $H_1$.

This method also multiplexes more users in the same resources, and at this time, it is only required to put the data of a plurality of corresponding different close-loop users in the corresponding layers of the close-loop users.

In the LTE_A, in the case that the number of the transmission antennas is extended to $N_T(N_T>8)$, the method of 4 antennas and 8 antennas can be similarly adopted, and at this time, a higher pre-coding and beam form gain can be obtained. The following transmission matrix can also be adopted to improve a transmission code rate:

$$[W_1 \ W_2] \begin{bmatrix} u_1 & u_2 & u_3 & u_4 & \cdots & u_{n-3} & u_{n-2} & u_{n-1} & u_n \\ u_{n+1} & u_{n+2} & u_{n+3} & u_{n+4} & \cdots & u_{2n-3} & u_{2n-2} & u_{2n-1} & u_{2n} \\ \vdots & \vdots & \vdots & \vdots & \cdots & \vdots & \vdots & \vdots & \vdots \\ u_{Nn-n+1} & u_{Nn-n+2} & u_{Nn-n+3} & u_{Nn-n+4} & \cdots & u_{Nn-3} & u_{Nn-2} & u_{Nn-1} & u_{Nn} \\ S_1 & S_2 & 0 & 0 & \cdots & S_{m-3} & S_{m-2} & 0 & 0 \\ 0 & 0 & S_3 & S_4 & \cdots & 0 & 0 & S_{m-1} & S_m \\ -S_2^* & S_1^* & 0 & 0 & \cdots & -S_{m-2}^* & S_{m-3}^* & 0 & 0 \\ 0 & 0 & -S_4^* & S_3^* & \cdots & 0 & 0 & -S_m^* & S_{m-1}^* \\ \vdots & \vdots & \vdots & \vdots & \cdots & \vdots & \vdots & \vdots & \vdots \\ 0 & 0 & -S_{Mm-m+4}^* & S_{Mm-m+3}^* & \cdots & 0 & 0 & -S_{Mm}^* & S_{Mm-1}^* \end{bmatrix}$$

wherein, u is the data of the close-loop user, S is the data of the open-loop user, S* is the conjugate of the S, −S* is the opposite number of the conjugate of the S, the layers of the close-loop users are N layers, the layers of the open-loop users are M layers, and N+M≤$N_T$ and $N_T$>8.

The effect of eliminating the interference of the data streams of the close-loop user will be validated with reference to examples in the following:

here, it will take examples of 4 transmission antennas and the close-loop users being 2 layers, and 8 transmission antennas and the close-loop users being 2 layers or 4 layers, respectively to illustrate the basic principle.

Example 1

4 transmission antennas, and when data streams of the close-loop users are mapped to 2 layers, and data streams of the open-loop users are mapped to 2 layers, the receiving matrix of the close-loop users is:

$$y_1 = H_1 W_1 \begin{bmatrix} u_1 & u_3 \\ u_2 & u_4 \end{bmatrix} + H_1 W_2 \begin{bmatrix} S_1 & S_2 \\ -S_2^* & S_1^* \end{bmatrix} \quad (2)$$

wherein, $u_i, S_i$ are data sent by the close-loop user and the open-loop user respectively, $S_i^*$ is the conjugate of the $S_i$, $-S_i^*$ is the opposite number of the conjugate of the $S_i$, i=1,2, $H_1$ is the channel matrix corresponding to the close-loop user, $W_j$ is the pre-coding matrix, and j=1,2, which can make the $\|H_1 W_1\|$ maximal, wherein $H_1$ is the channel matrix corresponding to the close-loop user.

Since $W_2$ is the zero space vector of the $H_1$, and $H_1 W_2=0$ is ensured, and therefore the valid part of the receiving matrix of the close-loop users only is:

$$y_1 = H_1 W_1 \begin{bmatrix} u_1 & u_3 \\ u_2 & u_4 \end{bmatrix} \quad (3)$$

It can be seen from formulas (2) and (3) that the pre-coding of the present invention is performed before transmission, and the open-loop user will not cause the interference on the receiving matrix received by the close-loop user.

The close-loop user performs maximal ratio combining (MRC), minimum mean square error (MMSE) or soft interference cancellation based on minimum mean square error (MMSE-SIC) to carry out detection, and finally recovers the original information of the transmission end.

Example 2

In the case of 8 transmission antennas and the data streams of the close-loop users being mapped to 2 layers, the receiving matrix of the close-loop users is:

$$y_1 = H_1 W_1 \begin{bmatrix} u_1 & u_3 \\ u_2 & u_4 \end{bmatrix} + H_1 W_2 \begin{bmatrix} S_1 & S_2 \\ -S_2^* & S_1^* \end{bmatrix} \quad (4)$$

In the case of 8 transmission antennas and the data streams of the close-loop users being mapped to 4 layers, the receiving matrix of the close-loop users is:

$$y_1 = H_1 W_1 \begin{bmatrix} u_1 & u_5 & u_9 & u_{13} \\ u_2 & u_6 & u_{10} & u_{14} \\ u_3 & u_7 & u_{11} & u_{15} \\ u_4 & u_8 & u_{12} & u_{16} \end{bmatrix} + H_1 W_2 \begin{bmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix} \quad (5)$$

wherein, $u_i, S_i$ are data sent by the close-loop user and the open-loop user respectively, and i=1,2, . . . , 16; $H_1$ is the channel matrix corresponding to the close-loop user, $W_j$ is the pre-coding matrix, and j=1,2.

Figure 2:
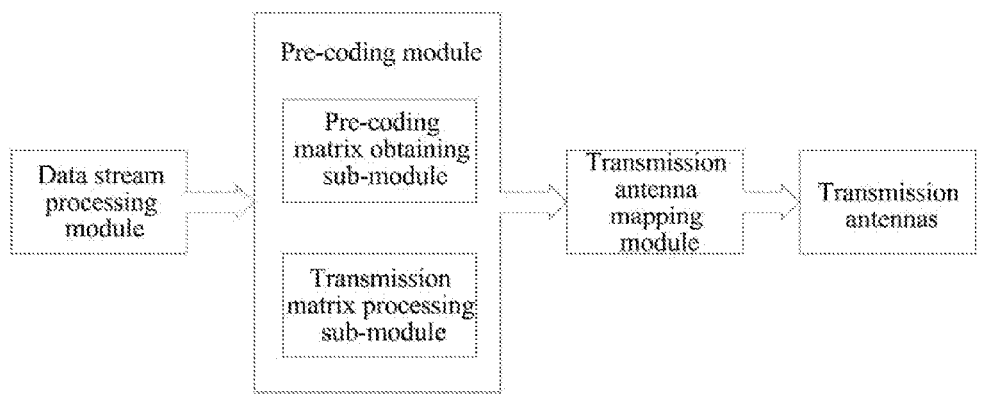
FIG. 2 is a schematic diagram of a module structure of a transmission apparatus according to the present invention.

In order to implement the above method, the present invention further provides a transmission apparatus, and as shown in FIG. 2, the apparatus comprises:

a data stream processing module, which is configured to perform a layer mapping on data streams to be transmitted of the open-loop user and the close-loop user;

a transmission pre-coding module, which is connected with the data stream processing module and is configured to perform a pre-coding processing on the layer data matrix of the open-loop user and the close-loop user after the layer mapping; wherein the transmission pre-coding module comprises:

a pre-coding matrix obtaining sub-module, which is configured to obtain the pre-coding matrixes $W_1$ and $W_2$, wherein the $W_2$ is the space vector of the zero space of the channel matrix $H_1$ of the close-loop user, said $W_1$ ensures that the signal to interference noise ratio (SINR) of the close-loop user is the maximum value;

the calculation and obtaining method of the pre-coding matrixes $W_1$ and $W_2$ can see the description in the method of the present invention;

a transmission matrix processing sub-module, which is connected with the pre-coding matrix obtaining sub-module and is configured to complete the pre-coding processing on the pre-coding matrixes $W_1$ and $W_2$ and the layer data matrixes of the close-loop user and open-loop user according to the transmission matrix;

the particular implementation of the transmission matrixes in different cases is the same with the description in the above method, and it will not be repeated any more herein;

the transmission antenna mapping module, which is connected with the pre-coding module and is configured to map the layer data matrix after the pre-coding processing into a plurality of transmission antennas;

transmission antennas, which are connected with the transmission antenna mapping module and are configured to send data.

The above description is only preferable embodiments of the present invention, and is not intended to limit the present invention. For those skilled in the art various corresponding modifications and variations can be made to the present invention. Any modifications, equivalents and improvements and so on made within the spirit and principle of the present invention will all fall into the protection scope of the present invention and the appended claims.

Generally speaking, finding two close-loop users who can be well paired to multiplex is optimal, but in certain cases, the pairing cannot be found. Under the case of the cell being full load, it is required to improve the frequency spectrum utilization ratio, and at this time, the method of the present invention is adopted to multiplex the open-loop high-speed user and close-loop low-speed user together, which can improve the frequency spectrum utilization ratio. Furthermore, due to adopting the transmission matrix of the present invention to perform the pre-coding processing, the interference among multi-user can be better reduced in the transmission end, and the performance is better than that of the multiplexing of two close-loop users who are completely unsuitable for pairing. Therefore, the method of the present invention is the suboptimal scheme adopted in the specified scenarios.

INDUSTRIAL APPLICABILITY

Comparing with the prior art, in the case of the cell being full load or other specified cases, the method of the present invention is adopted to multiplex the open-loop high-speed user and close-loop low-speed user together, which can improve the frequency spectrum utilization ratio. Furthermore, due to adopting the transmission matrix of the present invention to perform the pre-coding processing, the interference among multi-user can be better reduced in the transmission end, and the performance is better than that of the multiplexing of two close-loop users who are completely unsuitable for pairing. Therefore, the method of the present invention is the suboptimal scheme adopted in the specified scenarios.

What is claimed is:

1. A method for multi-user multiplexing, comprising:

a transmission apparatus performing a layer mapping on data steams to be transmitted of an open-loop user and a close-loop user respectively;

the transmission apparatus performing a pre-coding processing on a layer data matrix of the open-loop user and the close-loop user obtained by the layer mapping; and the transmission apparatus mapping the layer data matrix after the pre-coding processing to a plurality of transmission antennas to be sent;

wherein the step of performing the pre-coding processing comprises:

calculating pre-coding matrixes $W_1$ and $W_2$, wherein, said $W_2$ is a space vector of zero space of a channel matrix $H_1$ of the close-loop user, and said $W_1$ ensures that the signal to interference noise ratio of the close-loop user is a maximum value;

completing the pre-coding processing on the pre-coding matrixes $W_1$ and $W_2$ and the layer data matrix of the open-loop user and the close-loop user according to a transmission matrix.

2. The method as claimed in claim 1, wherein in a case of 4 transmission antennas and the data steams to be transmitted of the close-loop user being mapped to 1 layer, said transmission matrix is:

$$[W_1 \ W_2] \begin{bmatrix} u_1 & u_2 \\ S_1 & S_2 \\ -S_2^* & S_1^* \end{bmatrix}$$

wherein, $u_i, S_i$ are data to be transmitted of the close-loop user and the open-loop user respectively, $S_i^*$ is a conjugate of the $S_i$, $-S_i^*$ is an opposite number of the conjugate of the $S_i$.

3. The method as claimed in claim 1, wherein in a case of 4 transmission antennas and the data steams to be transmitted of the close-loop user being mapped to 2 layers, said transmission matrix is:

$$[W_1 \ W_2] \begin{bmatrix} u_1 & u_3 \\ u_2 & u_4 \\ S_1 & S_2 \\ -S_2^* & S_1^* \end{bmatrix}$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

4. The method as claimed in claim 1, wherein in a case of 8 transmission antennas and the data steams to be transmitted of the close-loop user being mapped to 1 layer, when the data steams to be transmitted of the open-loop user are mapped to 2 layers, said transmission matrix is:

$$[W_1 \ W_2] \begin{bmatrix} u_1 & u_2 \\ S_1 & S_2 \\ -S_2^* & S_1^* \end{bmatrix};$$

when the data steams to be transmitted of the open-loop user are mapped to 4 layers, said transmission matrix is:

$$[W_1 \ W_2] \begin{bmatrix} u_1 & u_2 & u_3 & u_4 \\ S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix};$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

5. The method as claimed in claim 1, wherein in a case of 8 transmission antennas and the data steams to be transmitted of the close-loop user being mapped to 2 layers, when the data steams to be transmitted of the open-loop user are mapped to 2 layers, said transmission matrix is:

$$[W_1 \ W_2] \begin{bmatrix} u_1 & u_3 \\ u_2 & u_4 \\ S_1 & S_2 \\ -S_2^* & S_1^* \end{bmatrix};$$

when the data steams to be transmitted of the open-loop user are mapped to 4 layers, said transmission matrix is:

$$[W_1 \ W_2] \begin{bmatrix} u_1 & u_3 & u_5 & u_7 \\ u_2 & u_4 & u_6 & u_8 \\ S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix};$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

6. The method as claimed in claim 1, wherein in a case of 8 transmission antennas and the data steams to be transmitted of the close-loop user being mapped to 3 layers, when the data steams to be transmitted of the open-loop user are mapped to 2 layers, said transmission matrix is:

$$[W_1 \ W_2] \begin{bmatrix} u_1 & u_4 \\ u_2 & u_5 \\ u_3 & u_6 \\ S_1 & S_2 \\ -S_2^* & S_1^* \end{bmatrix};$$

when the data steams to be transmitted of the open-loop user are mapped to 4 layers, said transmission matrix is:

$$[W_1 \ W_2] \begin{bmatrix} u_1 & u_4 & u_7 & u_{10} \\ u_2 & u_5 & u_8 & u_{11} \\ u_3 & u_6 & u_9 & u_{12} \\ S_1 & S_2 & 0 & 0 \\ 0 & 0 & S_3 & S_4 \\ -S_2^* & -S_1^* & 0 & 0 \\ 0 & 0 & -S_4^* & S_3^* \end{bmatrix},$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

7. The method as claimed in claim 1, wherein in a case of 8 transmission antennas and the data steams to be transmitted of the close-loop user being mapped to 4 layers, when the data steams to be transmitted of the open-loop user are mapped to 2 layers, said transmission matrix is:

$$[W_1 \ W_2] \begin{bmatrix} u_1 & u_5 \\ u_2 & u_6 \\ u_3 & u_7 \\ u_4 & u_8 \\ S_1 & S_2 \\ -S_2^* & S_1^* \end{bmatrix};$$

when the data steams to be transmitted of the open-loop user are mapped to 4 layers, said transmission matrix is:

$$[W_1 \ W_2] \begin{bmatrix} u_1 & u_5 & u_9 & u_{13} \\ u_2 & u_6 & u_{10} & u_{14} \\ u_3 & u_7 & u_{11} & u_{15} \\ u_4 & u_8 & u_{12} & u_{16} \\ S_1 & S_2 & 0 & 0 \\ 0 & 0 & S_3 & S_4 \\ -S_2^* & -S_1^* & 0 & 0 \\ 0 & 0 & -S_4^* & S_3^* \end{bmatrix},$$

wherein, $u_i, S_i$ are data to be transmitted of the close-loop user and the open-loop user respectively, $S_i^*$ is a conjugate of the $S_{i, \ and \ -Si}^*$ is an opposite number of the conjugate of the $S_i$.

8. The method as claimed in claim 1, wherein in a case that the number of transmission antennas is $N_T$, a following transmission matrix is adopted to complete the pre-coding processing:

$$[W_1 \ W_2] \begin{bmatrix} u_1 & u_2 & u_3 & u_4 & \cdots & u_{n-3} & u_{n-2} & u_{n-1} & u_n \\ u_{n+1} & u_{n+2} & u_{n+3} & u_{n+4} & \cdots & u_{2n-3} & u_{2n-2} & u_{2n-1} & u_{2n} \\ \vdots & \vdots & \vdots & \vdots & \cdots & \vdots & \vdots & \vdots & \vdots \\ u_{Nn-n+1} & u_{Nn-n+2} & u_{Nn-n+3} & u_{Nn-n+4} & \cdots & u_{Nn-3} & u_{Nn-2} & u_{Nn-1} & u_{Nn} \\ S_1 & S_2 & 0 & 0 & \cdots & S_{m-3} & S_{m-2} & 0 & 0 \\ 0 & 0 & S_3 & S_4 & \cdots & 0 & 0 & S_{m-1} & S_m \\ -S_2^* & S_1^* & 0 & 0 & \cdots & -S_{m-2}^* & S_{m-3}^* & 0 & 0 \\ 0 & 0 & -S_4^* & S_3^* & \cdots & 0 & 0 & -S_m^* & S_{m-1}^* \\ \vdots & \vdots & \vdots & \vdots & \vdots & \vdots & \vdots & \vdots & \vdots \\ 0 & 0 & -S_{Mm-m+4}^* & S_{Mm-m+3}^* & \cdots & 0 & 0 & -S_{Mm}^* & S_{Mm-1}^* \end{bmatrix},$$

wherein, u is data to be transmitted of the close-loop user, S is data to be transmitted of the open-loop user, S* is a conjugate of the S, −S* is an opposite number of the conjugate of the S, the data streams to be transmitted of the close-loop user are mapped to N layers, the data streams to be transmitted of the open-loop user are mapped to M layers, N+M≤$N_T$, and $N_T$>8.

9. The method as claimed in claim 1, wherein in a case that the number of transmission antennas is $N_T$, $N_T$>8, and the data steams to be transmitted of the close-loop user being mapped to 1 layer, said transmission matrix is:

$$[W_1 \; W_2] \begin{bmatrix} u_1 & u_2 \\ S_1 & S_2 \\ -S_2^* & S_1^* \end{bmatrix}$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

10. The method as claimed in claim 1, wherein in a case that the number of transmission antennas is $N_T$, $N_T$>8, and the data steams to be transmitted of the close-loop user being mapped to 2 layers, said transmission matrix is:

$$[W_1 \; W_2] \begin{bmatrix} u_1 & u_3 \\ u_2 & u_4 \\ S_1 & S_2 \\ -S_2^* & S_1^* \end{bmatrix}$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

11. The method as claimed in claim 1, wherein in a case that the number of transmission antennas is $N_T$, $N_T$>8, and the data steams to be transmitted of the close-loop user being mapped to 1 layer, when the data steams to be transmitted of the open-loop user are mapped to 2 layers, said transmission matrix is:

$$[W_1 \; W_2] \begin{bmatrix} u_1 & u_2 \\ S_1 & S_2 \\ -S_2^* & S_1^* \end{bmatrix};$$

when the data steams to be transmitted of the open-loop user are mapped to 4 layers, said transmission matrix is:

$$[W_1 \; W_2] \begin{bmatrix} u_1 & u_2 & u_3 & u_4 \\ S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix};$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

12. The method as claimed in claim 1, wherein in a case that the number of transmission antennas is $N_T$, $N_T$>8, and the data steams to be transmitted of the close-loop user being mapped to 2 layers, when the data steams to be transmitted of the open-loop user are mapped to 2 layers, said transmission matrix is:

$$[W_1 \; W_2] \begin{bmatrix} u_1 & u_3 \\ u_2 & u_4 \\ S_1 & S_2 \\ -S_2^* & S_1^* \end{bmatrix};$$

when the data steams to be transmitted of the open-loop user are mapped to 4 layers, said transmission matrix is:

$$[W_1 \; W_2] \begin{bmatrix} u_1 & u_3 & u_5 & u_7 \\ u_2 & u_4 & u_6 & u_8 \\ S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix};$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

13. The method as claimed in claim 1, wherein in a case that the number of transmission antennas is $N_T$, $N_T$>8, and the data steams to be transmitted of the close-loop user being mapped to 3 layers, when the data steams to be transmitted of the open-loop user are mapped to 2 layers, said transmission matrix is:

$$[W_1 \; W_2] \begin{bmatrix} u_1 & u_4 \\ u_2 & u_5 \\ u_3 & u_6 \\ S_1 & S_2 \\ -S_2^* & S_1^* \end{bmatrix};$$

when the data steams to be transmitted of the open-loop user are mapped to 4 layers, said transmission matrix is:

$$[W_1 \; W_2] \begin{bmatrix} u_1 & u_4 & u_7 & u_{10} \\ u_2 & u_5 & u_8 & u_{11} \\ u_3 & u_6 & u_9 & u_{12} \\ S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix},$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

14. The method as claimed in claim 1, wherein in a case that the number of transmission antennas is $N_T$, $N_T$>8, and the data steams to be transmitted of the close-loop user being mapped to 4 layers, when the data steams to be transmitted of the open-loop user are mapped to 2 layers, said transmission matrix is:

$$[W_1 \ W_2]\begin{bmatrix} u_1 & u_5 \\ u_2 & u_6 \\ u_3 & u_7 \\ u_4 & u_8 \\ S_1 & S_2 \\ -S_2^* & S_1^* \end{bmatrix};$$

when the data steams to be transmitted of the open-loop user are mapped to 4 layers, said transmission matrix is:

$$[W_1 \ W_2]\begin{bmatrix} u_1 & u_5 & u_9 & u_{13} \\ u_2 & u_6 & u_{10} & u_{14} \\ u_3 & u_7 & u_{11} & u_{15} \\ u_4 & u_8 & u_{12} & u_{16} \\ S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix},$$

wherein, $u_i, S_i$ are data to be transmitted of the close-loop user and the open-loop user respectively, $S_i^*$ is a conjugate of the $S_i$, and $-S_i^*$ is an opposite number of the conjugate of the $S_i$.

15. A transmission apparatus, comprising:
a data stream processing module, which is configured to perform a layer mapping on data steams to be transmitted of an open-loop user and a close-loop user respectively, and obtain a layer data matrix of the open-loop user and the close-loop user;
a transmission pre-coding module, which is connected with said data stream processing module and is configured to perform a pre-coding processing on the layer data matrix of the open-loop user and the close-loop user;
a transmission antenna mapping module, which is connected with said transmission pre-coding module and is configured to map the layer data matrix after the pre-coding processing to a plurality of transmission antennas;
transmission antennas, which are connected with said transmission antenna mapping module and are configured to send data;
wherein said transmission pre-coding module comprises:
a pre-coding matrix obtaining sub-module, which is configured to obtain pre-coding matrixes $W_1$ and $W_2$, wherein said $W_2$ is a space vector of zero space of a channel matrix $H_1$ of the close-loop user, and said $W_1$ ensures that the signal to interference noise ratio of the close-loop user is a maximum value;
a transmission matrix processing sub-module, which is connected with said pre-coding matrix obtaining sub-module, and is configured to complete the pre-coding processing on the pre-coding matrixes $W_1$ and $W_2$ and the layer data matrix of the open-loop user and the close-loop user according to a transmission matrix.

* * * * *